United States Patent [19]
Leyburn et al.

[11] 3,739,097
[45] June 12, 1973

[54] TELEPHONE MESSAGE ACCOUNTING SYSTEM

[75] Inventors: Derek Leyburn, Ottawa, Khurshid Ahmad, Kanata, Robert Thomas Milne, Toronto, all of Ontario, Canada

[73] Assignee: The Bell Telephone Company of Canada, Montreal, Quebec, Canada

[22] Filed: Sept. 30, 1971

[21] Appl. No.: 185,300

[52] U.S. Cl. .............................................. 179/7.1 R
[51] Int. Cl. .......................................... H04m 15/00
[58] Field of Search ...................... 179/11, 7.1 R, 9, 179/10, 12

[56] References Cited

UNITED STATES PATENTS

| | | | |
|---|---|---|---|
| 2,531,637 | 11/1950 | Miller | 179/7.1 R |
| 2,894,068 | 7/1959 | Morris | 179/7.1 R |

*Primary Examiner*—Kathleen H. Claffy
*Assistant Examiner*—Kenneth D. Baugh
*Attorney*—David M. Rogers, Daniel R. Bereskin, Richard J. Parr et al.

[57] ABSTRACT

A telephone billing system in which a call identity indexer (CII) of the billing equipment of a central office is connected both to trunk circuits serving other offices possessing billing equipment (inter-office trunk circuits), and to trunk circuits serving offices lacking billing equipment (remote trunk circuits). Each trunk circuit has an automatic message accounting relay which, when operated, identifies that trunk circuit to the billing equipment for billing. Each remote trunk circuit has a bridge relay operative on connection of a register-sender thereto, during a call by (but not to) the remote trunk circuit, to operate the AMA relay therein. When a local line circuit makes a long distance call, it operates a local relay in the decoder-marker, and the local relay causes the AMA relay of the called trunk circuit to operate. Double billing is avoided since when a remote trunk circuit calls another remote or inter-office trunk circuit, neither the local relay, nor the bridge relay of the called trunk circuit, operates.

5 Claims, 5 Drawing Figures

TELEPHONE MESSAGE ACCOUNTING SYSTEM

This invention relates to an automatic message accounting system for common control telephone offices, particularly crossbar offices.

At present, there are two types of automatic message accounting systems used in common control telephone offices, namely central automatic message accounting (Cama) and local automatic message accounting (Lama). Lama is used when the billing equipment located in a particular office serves the customers of that office. Cama is used when there are several small offices which do not themselves have billing equipment, because their traffic cannot justify the expense. In that case, the small offices are connected to a larger central office, called a Cama office, which does have billing equipment. Whenever a customer of the small office makes a long distance call, this call is routed through the Cama office so that a bill can be made out.

Both billing systems include a device called a call identity indexer (CII), which in a Lama office is permanently connected to each of the inter-office trunks in the office. When a customer makes a long distance cell, the billing equipment records on perforated tape (1) an initial entry, namely the called and calling numbers, plus the number of the outgoing trunk being used for the call, as identified by the CII (the truck number is termed the call identity index), (2) the answer entry (when the called party answers), namely the time of day, and the number of the truck being used, i.e. the call identity index, (3) the disconnect entry (when the call is completed), namely the time of day and the trunk number being used, i.e. the call identity index. Since considerable time may elapse between the time when the long distance call is instituted and the time when the called party in the distant office answers, the billing equipment is not held up during this time but proceeds to record details of other calls at the same time and also during the call itself, so that the perforated billing tape contains details of a number of calls all jumbled together. The three entries for a particular call are associated later by accounting machines using the call identity index (which is recorded for each such entry) and the time of day.

In a Lama office, the CII is as mentioned connected to the trunk circuits. The CII could instead be connected to the local line circuits, but since there are usually far more line circuits than truck circuits in an office, it is more economical to connect the CII to the truck circuits. In the case of tandem Cama offices, which have only trunks connecting other offices, the CII is connected to all of the incoming trunks in the office.

In some cases an office is both a Cama and Lama office, i.e. it handles billing for remote offices and at the same time it has customers of its own. In such cases, the CII is connected only to those inter-office trunk circuits which extend to offices other than those for which the CII handles the billing. The CII cannot also be connected to the trunk circuits from the small offices served by the billing equipment, because if it were, and if a remote customer connected to a small office made a long distance call to a distant office, he would be billed twice, once from the incoming trunk circuit and once from the outgoing trunk circuit of the office containing the billing equipment. However, the disadvantage of connecting the CII in the normal manner just described is that there is then no way to bill customers from small remote offices (remote customers) when they call the office containing the billing equipment. This is because the only billing equipment available is connected to the outgoing trunk circuits in the office, and these trunk circuits are not used when a customer of the smaller office calls a local customer in the office containing the billing equipment.

The invention solves this problem by connecting the CII to the incoming trunk circuits from small offices which do not contain billing equipment or from remote customers, and by also connecting the CII to the outgoing trunk circuits of the office containing the billing equipment. In a preferred embodiment of the invention, all calls made from the remote office or customer are charged using the call identity index of the trunk circuit incoming from such remote office or customer to the office containing the billing equipment. Long distance calls made by local customers are charged using the call identity index of outgoing trunk circuits from the office, and special circuits in the decoder-marker are provided to cause use of such call identity index. Long distance calls from remote customers through the office containing the billing equipment to another office are billed using the call identity index of the incoming trunk circuit to the office containing the billing equipment, and at this time the decoder-marker detects that the calling circuit connected to it is an incoming trunk circuit rather than a local line circuit, and the decoder-marker then ensures that the call identity index of the outgoing trunk circuit will not be used.

Further objects and advantages of the invention will appear from the following description, taken together with the accompanying drawings, in which.

In the accompanying drawings, conventional detached contact notation is used, wherein a — and an ×, when marked with relay contact letters and numbers, represent relay contacts that are closed and opened respectively when the relay is de-energized. Crossbar switch cross-points are indicated by conventional × symbols, either unnumbered or marked with simple numerals, instead of with relay contact notation.

Figure 1:
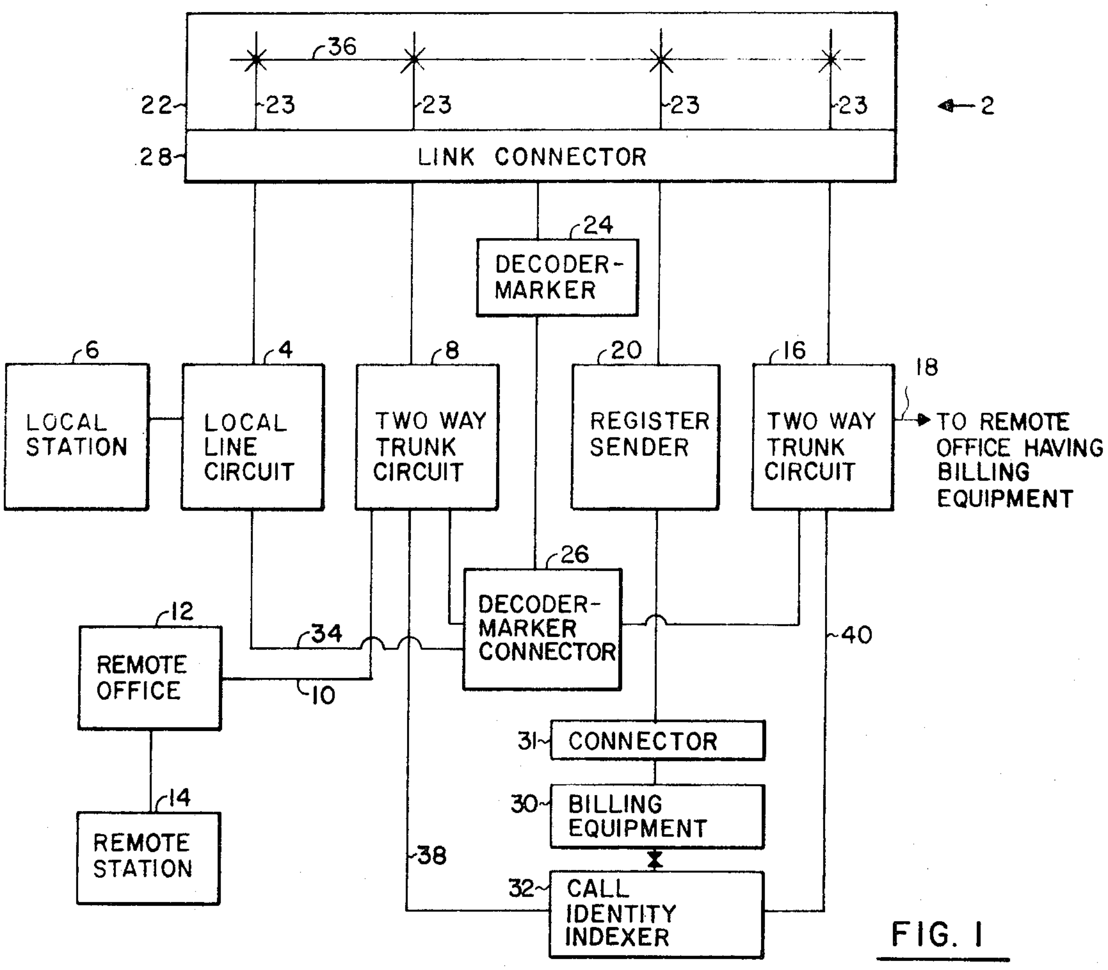
FIG. 1 is a block diagram showing a telephone system according to the invention.

The invention will be described with reference to a four wire crossbar switching machine manufactured and sold by Western Electric Company under its model no. 758 C. Since this is a standard commercially available common control office utilizing well known principles, it will be described only to the extent necessary to explain the invention. This switching office, indicated generally at 2 in FIG. 1, includes four wire station line circuits 4 which connect local stations 6 to the office, two way remote station trunk circuits 8 each of which terminates a trunk 10 extending to a remote office 12 having its own local stations 14 but lacking any billing equipment, and two way inter-office trunk circuits 16 (identical with trunk circuits 8 except as will be described) which terminate trunks 18 extending to remote offices having billing equipment.

The model 758 C office also includes register-senders 20 which receive and store digits dialled by a customer or sent by a register-sender in another office and which can also transmit digits on inter-office calls, and link frames 22 which contain crossbar switches having verticals 23 to which the line and trunk circuits and register-senders within the office are connected. In addition the office 2 includes one or more decoder-markers 24 which decode dialled digits and control the interconnection of line circuits, trunk circuits and register-senders within the office, decoder-marker connectors 26 which connect the decoder-markers to line and trunk circuits and to the register-senders for the transfer of control information, and link connectors 28 which connect the decoder-markers 24 to the link frames for the selection and closing of cross-points and for transfer of some control information. Billing equipment 30 (connectable to the register-sender by a connector 31) and a call identity indexer 32 are also provided to allow calls to be charged.

The operation of the switching machine 2 is as follows. On a request for service from a line circuit 4, effected when a customer station 6 goes off-hook, the line relay (not shown) in the line circuit 4 grounds connection 34 to the decoder-marker connector 26, seizing the decoder-marker 24. The decoder-marker 24 then seizes the calling line circuit 4 via the link connector 28 and obtains the calling line location. At the same time, the decoder-marker 24 selects an idle register-sender 20 via the link connector 28. The decoder-marker transfers to the register-sender the information as to the calling line location and closes appropriate cross-points to establish a dial connection via an idle horizontal link 36 between the calling line circuit 4 and the selected register-sender 20. The decoder-marker 24 then releases. Dial tone is provided by the register-sender 20 to the calling line circuit 4, so that the calling party may dial.

The register-sender 20 receives and stores the incoming digits. After the register-sender 20 has received some or all of the dialled digits, it calls in the decoder-marker 24 again, via the decoder-marker connector 26, and passes to the decoder-marker the called number and the equipment location of the calling line. On local calls, the decoder-marker 24, from the called number information, seizes and tests the called line circuit via the connector 28, operates appropriate cross-points to connect the called line circuit to the horizontal link 36 being used on the call, instructs the register-sender 20 to release, and causes ringing to be applied to the called line. On calls between offices, the decoder-marker 24 seizes and tests an idle trunk circuit 8 or 16, as required, and closes appropriate cross-points to connect this trunk circuit to the horizontal link being used for the call. The decoder-marker then releases, and the register-sender sends the called digits forward to establish a connection in the called office.

Figure 2:
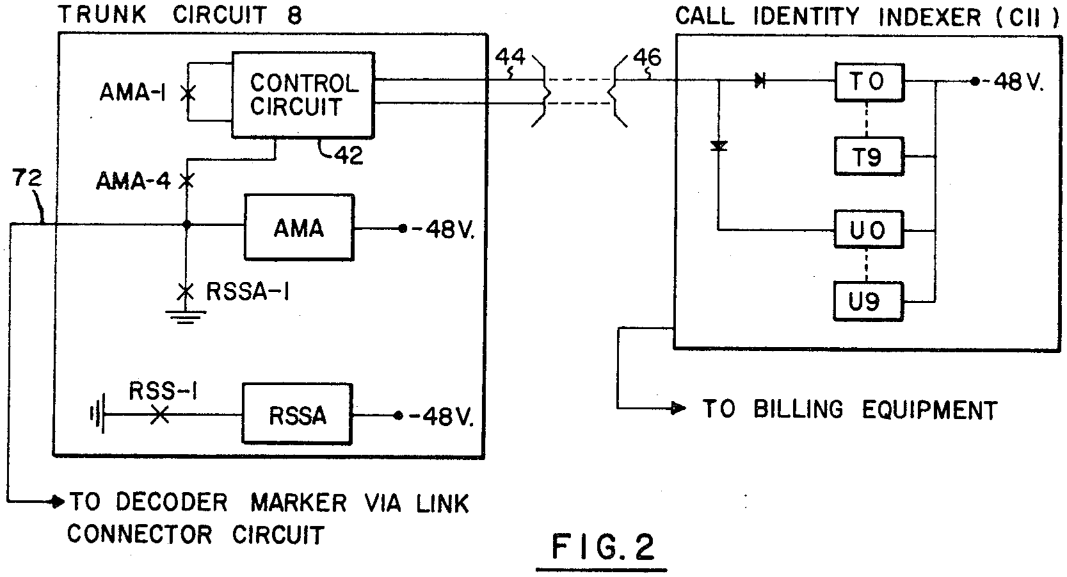
FIG. 2 is a schematic, partly in block form, showing portions of a trunk circuit and call identity indexer according to the invention.

It will be seen that the CII is connected to each trunk circuit in the office, i.e. it is connected both to remote station trunk circuits 8 by leads 38 and to interoffice trunk circuits 16 by leads 40. The manner in which the CII records the call identity index of a given trunk is described with reference to FIG. 2. FIG. 2 shows a portion of a remote customer trunk circuit 8 and a portion of the CII 32, but FIG. 2 is equally applicable to the interoffice trunk circuits 16.

As shown in FIG. 2, each trunk circuit 8 (and each trunk circuit 16) includes an automatic message accounting relay AMA. The AMA relay in any given trunk operates, by means to be described, when a bill is to be made using the call identity index of such trunk. Each trunk circuit 8 (and each trunk circuit 16) also includes a conventional control circuit 42 which is enabled by contact AMA–1 when its AMA relay is operated and which is permanently wired to the CII by leads 44. Assuming that there are (for example) one hundred trunks to be indexed, the CII contains ten tens relays T0 to T9 and ten units relays U0 to U9. One lead 46 of each set of leads 44 from each trunk is connected to an appropriate one of the tens relays and to an appropriate one of the units relays. For example, in FIG. 2 lead 46 is shown connected to tens relay T0 and to units relay U0, so the call identity index of trunk 8 of FIG. 2 is 00.

When the AMA relay in the trunk circuit 8 operates, its contact AMA–1 enables the control circuit 42 and the control circuit 42 then grounds lead 46 at the time of the initial entry, the answer entry and the disconnect entry, so that the CII will record the particulars of the trunk at these times. The manner in which the control circuit 42 operates in the 758 C office as equipped with automatic message accounting is entirely conventional; it is the operation of the AMA relay with which the invention is concerned. According to the invention the AMA relay is operated as shown in Table I:

TABLE I

| Call From | Call To | AMA Relay Operated |
|---|---|---|
| 1. local station **6** | another local station | none |
| 2. local station **6** | inter-office call via trunk circuit **16** | AMA in trunk circuit **16** (operated by decoder-marker) |
| 3. local station **6** | remote station **14** | AMA in trunk circuit **8** (operated by decoder-marker) |
| 4. remote station **14** | local station **6** | AMA in trunk circuit **8** (operated by register-sender) |
| 5. remote station **14** | inter-office call via trunk circuit **16** | AMA in trunk circuit **8** (operated by register-sender) |
| 6. another office via trunk circuit **16** | any | none |

Figure 3:
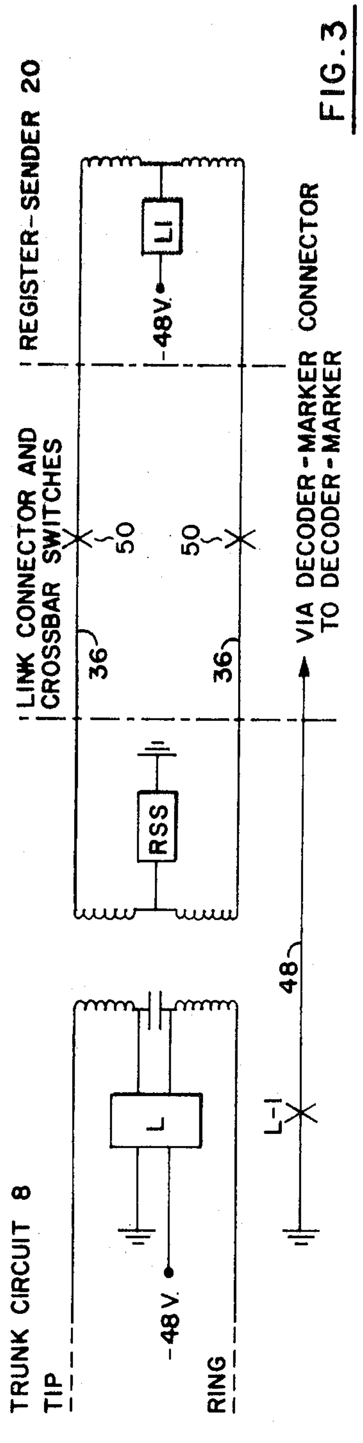
FIG. 3 is a schematic showing portions of a trunk circuit, link connector and register-sender as used with the invention.

It will be seen that in cases 4 and 5, where calls are made by the remote station, the AMA relay in remote station trunk circuit 8 is operated by the register-sender 20. The manner in which the register-sender 20 performs this function is shown in FIGS. 2 and 3. When the remote station goes off-hook, seizing the trunk circuit 8, and the line relay L (FIG. 3) in the trunk circuit 8 operates, contact L–1 grounds start lead 48 to the decoder-marker connector 26. Connector 26 engages an idle decoder-marker 24, which identifies the calling trunk circuit, selects an idle register-sender 20, locates an idle horizontal link 36 and closes cross-points 50 to connect the trunk circuit 8 to the register-sender 20. As soon as the register-sender 20 is thus connected, a circuit is completed via link 36 between its line relay L1 and bridge relay RSS in the trunk circuit, and both these relays operate. As shown in FIG. 2, contact RSS–1 then operates auxiliary relay RSSA in the trunk circuit, and contact RSSA–1 then operates relay AMA. Relay AMA locks operated through contact AMA–4 to the control circuit 42 and remains operated for the duration of the call. It will be appreciated that relays L, RSS and L1 are all standard features of the model 758 C office, as is relay AMA, but the addition of relay RSSA so that the register-sender operates the AMA relay is new.

Calls from a local station 6 to a remote station 14 will next be discussed. Since local line circuits 4 in the model 758 C office (and indeed in most crossbar offices) do not contain any ANA relay, therefore if the call is to be billed, the AMA relay in the called remote station trunk circuit 8 must be operated. However, it is a characteristic of the model 758 C office that the RSS relay in a trunk circuit does not operate on calls to the trunk circuit (as opposed to calls from the trunk circuit). Hence, other means, illustrated in FIGS. 4 and 5, are provided to operate the AMA relay in the trunk circuit 8 during calls from local stations.

Figure 4:
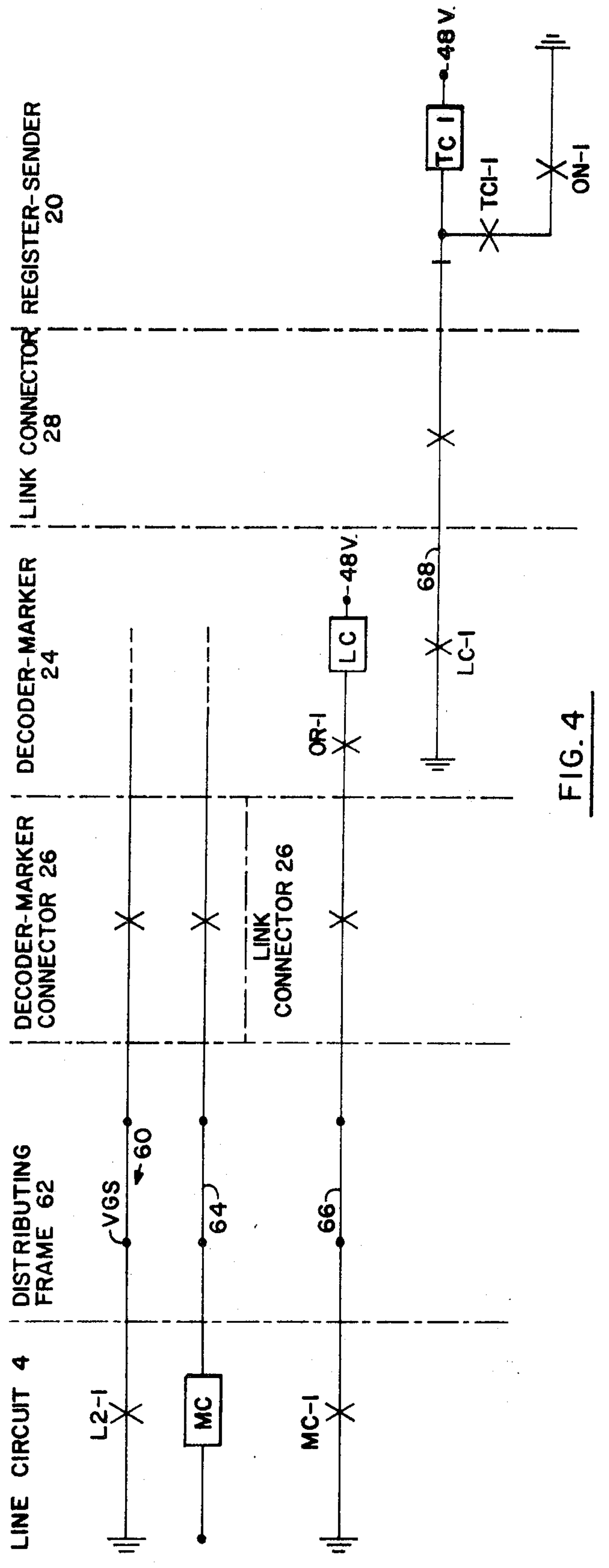
FIG. 4 is a schematic showing the connection of a line circuit through a distributing frame and link connector to the decoder-marker, with subsequent connections to the register-sender.
Figure 5:
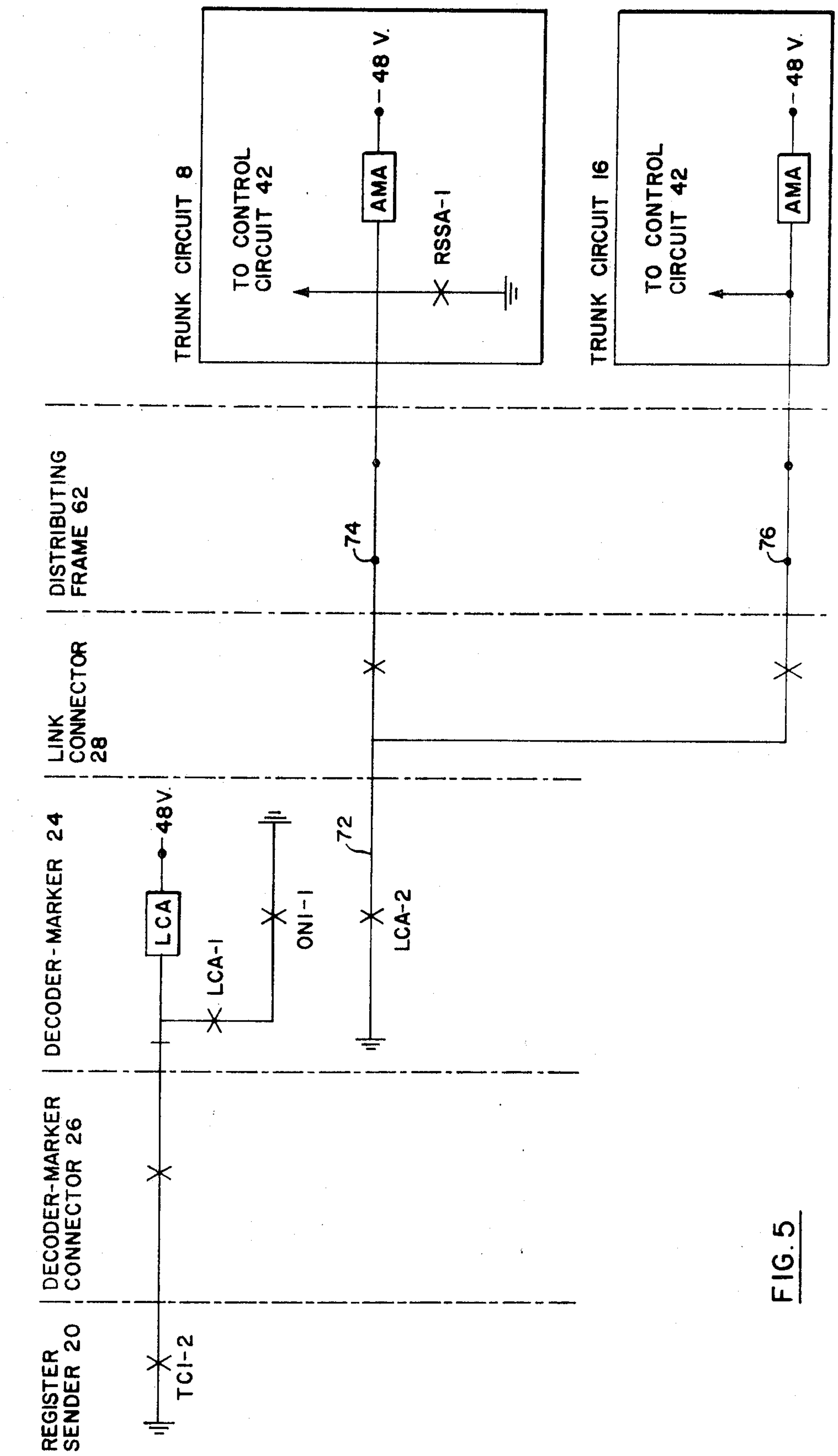
FIG. 5 is a schematic showing connections between the register-sender and the decoder-marker, and between the decoder-marker and trunk circuits.

FIG. 4 shows a portion of a line circuit 4, together with cross-connections 60 on a distributing frame 62. (The distributing frame carries the cross-connections from line and trunk circuits to the connector circuits). When a station goes off-hook, the line relay (not shown) in its line circuit operates, and contact L2–1 of the line relay grounds vertical start lead VGS to the decoder-marker connector 26. The decoder-marker connector 26 then seizes an idle decoder-marker 24. When the decoder-marker 24 is seized, it seizes via the link connector circuit 28 the link frame 22 to which the line circuit is connected, having identified the link frame by the particular VGS lead that was grounded. The decoder-marker 24 also grounds leads 64 to the line circuit, operating marker connect relay MC therein (informing the line circuit 4 that the decoder-marker has been connected).

When relay MC in the line circuit 4 operates, its contacts connect a number of information leads from the line circuit through the link connector 28 to the decoder-marker. This is standard operation in the model 758 C office. However, among these leads is lead 66, which connects ground via contact MC1–1 and through contact OR–1 to a local relay LC in the decoder-marker. Contact OR–1 is a contact of a conventional relay OR (not shown) in the decoder-marker which operates only when the circuit connected to the decoder-marker is originating a call (i.e. when such circuit is a calling circuit, not a called circuit). Thus, when the decoder-marker seizes a calling line circuit, relay LC in the decoder-marker operates.

While the decoder-marker 24 is seizing the line circuit 4, it also seizes, via the link connector, an idle register-sender 20, which it connects to the horizontal link 36 being used in the call and to which it passes certain information. Included in this information is that relay LC has operated. Specifically, when the register-sender is connected to the decoder-marker, contact LC–1 extends ground via lead 68 through the link connector 28 to operate relay TC1 in the register-sender 20. Relay TC1 then locks operated through its contacts TC1–1 and contact ON–1 of an off-normal relay (not shown) in the register-sender which operates whenever the register-sender is engaged. After the register-sender 20 has received the called number it seizes the decoder-marker 24 again (via the decoder-marker connector) and transfers the called number and other information to the decoder-marker, so that the decoder-marker can seize the called circuit and can connect it to the horizontal link used on the call. When the register-sender becomes connected to the decoder-marker, contact TC1–2 (FIG. 5) in the register-sender extends ground on lead 70 to operate local auxiliary relay LCA in the decoder-marker. Relay LCA locks operated through contact LCA–1 and contact ON1–1 of an off-normal relay (not shown) in the decoder-marker which operates whenever and as long as the decoder-marker is engaged.

Relay LCA is used to operate the AMA relay in a trunk circuit 8 or 16 when a call is made from a local line circuit 4 to a trunk circuit 8 or 16. For this purpose, a lead 72 extends from ground through contact LCA–2 of relay LCA, and through the cross-points of the link connector 28 to terminals 74, 76 of the link connector. Terminal 74 is cross-connected through the distributing frame 62 to the AMA relay of trunk circuit 8 (see also FIG. 2), and terminal 76 is similarly cross-connected to the AMA relay of trunk circuit 16.

Thus, when a local station 6 calls a remote station 14, for example, relay LC in the decoder-marker operates when the decoder-marker is first seized, and then relay LCA in the decoder-marker 24 operates when the decoder-marker is seized by the register-sender to make the connection to the called circuit. When the decoder-marker has ascertained which circuit is being called, in this case trunk circuit 8, it seizes the circuit 8 via link connector 28, and this connects lead 72 via terminal 74 to the AMA relay in the trunk circuit 8, thereby operating this AMA relay. Similarly, when a local line station calls another office via a trunk circuit 16, then when the decoder-marker seizes trunk circuit 16, lead 72 becomes connected to terminal 76 to operate the AMA relay in trunk circuit 16.

If a remote customer station calls another office via an inter-office trunk circuit 16, then relay LC in the decoder-marker does not operate (because of open contact OR–1 in lead 66, FIG. 4), and no ground is extended over lead 74, FIG. 5. Thus, the AMA relay in the called trunk circuit 16 does not operate. Similarly, if one remote customer station calls another via a trunk circuit 8, again relays LC and LCA do not operate and no ground is extended over lead 72 to operate the AMA relay in the called trunk circuit.

In each inter-office trunk circuit 16, relay RSSA is omitted (or the connection between ground and the AMA relay through contact RSSA–1 is omitted), so that on calls from other offices via an inter-office trunk circuit 16, the AMA relay in circuit 16 will not operate when circuit 16 becomes connected to a local register-sender 20. Thus no AMA relay operates on a call incoming on a trunk circuit 16 from another office.

In summary, when a remote trunk circuit 8 calls a local station, the AMA relay in the remote trunk circuit operates when a register-sender becomes attached, since the connection of a register-sender operates relays RSS and RSSA in the trunk circuit 8 (FIG. 2), and a contact of relay RSSA then operates relay AMA in the trunk circuit 8. When a local line circuit calls a remote trunk circuit 8 or an interoffice trunk circuit 16, when the local line circuit is connected to the decoder-marker, local relay LC in the decoder-marker operates, and then when the decoder-marker is connected to the called trunk circuit, the decoder-marker operates the AMA relay in the called trunk circuit via lead 72 (FIG. 5).

When a remote station trunk circuit 8 calls an inter-office trunk 16 or another remote station trunk circuit 8, then when the register-sender becomes attached to the calling remote trunk circuit 8, the connection operates relays RSS and RSSA in the calling trunk circuit 8 as before, and a contact of relay RSSA operates relay AMA. Since relays LC and LCA in the decoder-marker do not operate, there is no circuit to operate the AMA relay in the called trunk circuit as such AMA relay does not operate.

In some cases, remote office 12 will have no switching facilities and will contain only a trunk circuit connected directly to remote station 14. This situation may occur for example in a data switching network, where there is only one customer in a particular city. The invention is particularly useful in this case because it permits calls by the remote station 14 to the office 2 to be billed without interfering with charging of calls from local customers of the office 2.

What we claim is:

1. In a telephone system, an office having:

a. a plurality of line circuits, b. a plurality of trunk circuits, at least one of said trunk circuits being a remote station trunk circuit adapted to be connected to an office lacking billing equipment, others of said trunk circuits being inter-office trunk circuits adapted to be connected to offices having billing equipment, c. number receiving means adapted to receive digit information, d. switching means for connecting a calling line or trunk circuit to said number receiving means for the latter to receive called number information, e. automatic message accounting means for recording call charge information, f. each trunk circuit including identity means, g. a call identity indexer connected to said identity means of each trunk and to said automatic message accounting means and responsive to operation of said identity means in a trunk circuit for identifying such trunk circuit to said automatic message accounting means, h. said one trunk circuit including operating means responsive to connection of said number receiving means thereto to operate said identity means of said one trunk circuit during a call from said one trunk circuit but not during a call to said one trunk circuit, and said inter-office trunk circuits lacking said operating means, i. said switching means including local circuit means operative upon connection of said switching means to a said line circuit, and means for connecting said local circuit means to a trunk circuit upon a call for such line circuit to such trunk circuit, j. each said trunk circuit including means responsive to connection of said operated local circuit means thereto for operating said identity means of such trunk circuit, whereby to cause such trunk circuit to be identified to said automatic message accounting means.

2. Apparatus according to claim 1 wherein said office is a crossbar office, said number receiving means being a register-sender.

3. Apparatus according to claim 2 wherein said switching means includes a decoder-marker.

4. Apparatus according to claim 3 wherein said local circuit means includes a local relay having a normally open contact, and transmission means for applying a signal through said normally open contact to a selected terminal of said decoder-marker, said switching means including means for connecting said selected terminal to a called trunk circuit during a call to such call trunk circuit.

5. Apparatus according to claim 4 wherein said identity means of said one trunk circuit comprises an automatic message accounting relay, said operating means comprising a bridge relay in said one trunk circuit, means for operating said bridge relay upon connection of said number receiving means to said one trunk circuit, and means including a contact of said bridge relay for operating said automatic message accounting relay upon operation of said bridge relay.

* * * * *